United States Patent
Allison et al.

(10) Patent No.: US 6,745,041 B2
(45) Date of Patent: Jun. 1, 2004

(54) METHODS AND SYSTEMS FOR COMMUNICATING BETWEEN SUBSCRIBERS OF DIFFERENT APPLICATION-LAYER MOBILE COMMUNICATIONS PROTOCOLS

(75) Inventors: Rick L. Allison, Apex, NC (US); Thomas M. McCann, Morrisville, NC (US)

(73) Assignee: Tekelec, Calabasas, CA (US)

( * ) Notice: Subject to any disclaimer, the term of this patent is extended or adjusted under 35 U.S.C. 154(b) by 0 days.

(21) Appl. No.: 09/909,099

(22) Filed: Jul. 19, 2001

(65) Prior Publication Data

US 2003/0003930 A1 Jan. 2, 2003

Related U.S. Application Data

(60) Provisional application No. 60/301,601, filed on Jun. 27, 2001.

(51) Int. Cl.[7] .................................................. H04Q 7/20
(52) U.S. Cl. ........................................ 455/466; 455/445
(58) Field of Search ................................. 370/400–409, 370/354, 355, 356, 385–388, 395.5; 709/230, 238; 455/414, 422, 445, 466, 552, 553, 560, 190.1, 517

(56) References Cited

U.S. PATENT DOCUMENTS

| | | | | |
|---|---|---|---|---|
| 5,841,854 A | * | 11/1998 | Schumacher et al. | 379/224 |
| 5,862,481 A | * | 1/1999 | Kulkarni et al. | 455/432 |
| 5,867,788 A | * | 2/1999 | Joensuu | 379/219 |
| 6,134,441 A | * | 10/2000 | Astrom et al. | 455/445 |
| 6,138,007 A | | 10/2000 | Bharatia | 455/414 |
| 6,208,870 B1 | * | 3/2001 | Lorello et al. | 455/412 |
| 6,298,232 B1 | * | 10/2001 | Marin et al. | 455/413 |
| 6,308,075 B1 | * | 10/2001 | Irten et al. | 379/221.14 |
| 6,356,529 B1 | | 3/2002 | Zarom | |
| 6,363,431 B1 | | 3/2002 | Hammer et al. | |
| 6,421,674 B1 | * | 7/2002 | Yoakum et al. | 707/10 |
| 6,453,174 B1 | | 9/2002 | Cunningham et al. | 455/560 |

OTHER PUBLICATIONS

Bertrand, "Jambala Mobility Gateway–Convergence and Inter–System Roaming," Ericsson Review, p. 89–93, (1999).
U.S. patent application Ser. No. 10/405,859, McCann et al., filed Apr. 2, 2003.

* cited by examiner

*Primary Examiner*—Jean Gelin
(74) *Attorney, Agent, or Firm*—Jenkins, Wilson & Taylor, P.A.

(57) ABSTRACT

A routing node communicates between subscribers of different application-layer mobile communications protocols, such as IS-41 and GSM, without converting each IS-41 message to GSM and vice versa. Rather than converting each message to the protocol of the intended recipient, the routing node functions as an HLR to provide the location of a mobile subscriber in a different application-layer mobile communications protocol and as an MSC to forward short message service messages to a short message service center of the other application-layer mobile communications protocol.

25 Claims, 4 Drawing Sheets

METHODS AND SYSTEMS FOR COMMUNICATING BETWEEN SUBSCRIBERS OF DIFFERENT APPLICATION-LAYER MOBILE COMMUNICATIONS PROTOCOLS

RELATED APPLICATIONS

This application claims the benefit of U.S. provisional patent application No. 60/301,601, filed Jun. 27, 2001, the disclosure of which is incorporated herein by reference in its entirety.

TECHNICAL FIELD

The present invention relates generally to methods and systems for communicating between subscribers of different application-layer mobile communications protocols. More particularly, the present invention relates to methods and systems for establishing calls and forwarding short message service messages between ANSI IS-41 mobile subscribers and GSM mobile subscribers.

BACKGROUND ART

American National Standards Institute (ANSI) Interim Standard 41 (IS-41) includes application-layer protocols used to set up mobile calls and deliver short message service messages between mobile subscribers. IS-41 is the dominant standard for mobile communications in North America. The Global System for Mobile Communications (GSM) is the dominant standard in Europe. GSM networks provide services similar to those provided by ANSI networks, such as call delivery, short message service, mobility management, etc.

Because IS-41 and GSM standards each specify different messages for call setup and short message service, interworking systems have been developed. One type of interworking system that has been developed is a roaming gateway. A roaming gateway converts GSM messages to IS-41 messages and vice versa when a GSM subscriber is roaming in an IS-41 network or when an IS-41 mobile subscriber is roaming in a GSM network.

One problem with roaming gateways is that protocol conversion is performed for each message required to establish a call or deliver a short message service (SMS) message. For example, in order to deliver an SMS message from an IS-41 subscriber to a GSM subscriber, the IS-41 short message service center (SMSC) serving the IS-41 subscriber sends an IS-41 Short Message Service Request (SMSREQ) message to an IS-41 home location register (HLR). A roaming gateway receives the IS-41 SMSREQ Message, determines that the message is attempting to locate a GSM subscriber, converts the message into a GSM Send Routing Information for Short Message message, and forwards the message to a GSM HLR. The GSM HLR responds with a Send Routing Information for SM Acknowledge message that contains the MSC ID of the mobile switching center serving the intended recipient. The roaming gateway receives the Send Routing Information for SM Acknowledge message, converts the message into an IS-41 SMSREQ message containing the requested information and forwards the message to the IS-41 SMSC. This translation between GSM and IS-41 is repeated for each message transmitted between GSM and IS-41 network elements.

Translating each message required to set up a call or deliver an SMS message results in a high processing load on the translating node and increases call setup or SMS message delivery time. For example, because a roaming gateway is required to intercept and translate each message in a call flow, the roaming gateway may spend a significant amount of its processing resources on translating messages. The time required for translating each message can also increase call setup or SMS message delivery time. In addition, because the roaming gateway terminates IS-41 and GSM signaling, it is required to handle and translate error messages in both protocols. For instance, if a GSM short message service message recipient deactivates his or her mobile handset, the roaming gateway is responsible for receiving the GSM error message from the GSM MSC serving the called party, translating the error message to IS-41, and delivering the error message to the IS-41 SMSC. The roaming gateway may also be responsible for receiving a response from the IS-41 SMSC, translating the response to GSM, and forwarding the response to the serving GSM MSC. Handling and translating such error messages further increases the processing load on the roaming gateway.

Accordingly, there exists a long-felt need for improved methods and systems for setting up calls and delivering short message service messages between subscribers of different application-layer mobile communications protocols.

DISCLOSURE OF THE INVENTION

The present invention includes methods and systems for setting up calls and delivering short message service messages between mobile subscribers of different application-layer mobile communications protocols. As used herein, the phrase "application-layer mobile communications protocol" refers to any protocol that operates at the application layer and is used for mobile call setup and short message service. Examples of application-layer mobile communications protocols include IS-41 and GSM.

According to one aspect, the present invention includes a routing node that receives either ANSI or GSM messages and emulates both HLR and MSC functionality to deliver SMS messages to a destination node without translating each message required to deliver the SMS messages. In the case where a GSM subscriber sends a short message service message to an IS-41 subscriber, the routing node receives a Send Routing Information for SM (SRI-SM) message from the SMSC serving the GSM subscriber. The routing node determines that the SRI-SM message is requesting routing information for an IS-41 subscriber. In response, rather than converting the SRI-SM message into an IS-41 SMSREQ message, the routing node responds to the SRI-SM message with an SRI-SM acknowledge message with the SMSC ID of an IS-41 SMSC stored in the mobile application part (MAP) MSC number field. The GSM SMSC that receives the SRI-SM ACK message interprets the SMSC ID as an MSC ID because of its location in the SRI-SM ACK message. As a result, the GSM SMSC sends a GSM mobile-terminated Forward Short Message (FSM) message that it believes is destined for a GSM MSC. By providing an IS-41 SMSC ID in the MSC ID field, the routing node eliminates the need for translation of the GSM SRI-SM message into an IS-41 SMSREQ message.

The routing node intercepts the mobile-terminated GSM Forward Short Message message transmitted by the GSM SMSC, determines it is destined for an IS-41 subscriber by examination of the number and maps the message to an IS-41 mobile-originated Short Message Delivery Point to Point (SMDPP) Invoke message. The routing node then forwards the mobile-originated SMDPP Invoke message to the IS-41 SMSC identified by the SMSC ID in the MSC number field. The IS-41 SMSC is responsible for delivering the message to the intended recipient. By converting the GSM mobile-terminated FSM message to a mobile-originated IS-41 SMDPP Invoke message, the routing node appears as an IS-41 MSC delivering a short message from a mobile station to the IS-41 network.

According to another aspect of the invention, the routing node is capable of forwarding IS-41-originating short message service messages to GSM subscribers without requiring translation of each IS-41 message to GSM and vice versa. In the IS-41-originating scenario, the routing node receives an SMSREQ Invoke message from an IS-41 SMSC. The routing node determines that the SMSREQ message is destined for a GSM subscriber and, in response, sends an SMSREQ Return Result message to the IS-41 SMSC. The routing node inserts its own point code and subsystem number in the SMS_Address field of the message, rather than the address of the MSC serving the intended recipient. However, because the PC and SSN values are in the SMS_Address field, the IS-41 SMSC interprets these values as being the address of the intended destination. Accordingly, the IS-41 SMSC formulates and sends a mobile-terminated SMDPP Invoke message using the point code and subsystem number of the routing node, rather than the destination switch.

When the routing node receives the SMDPP Invoke message, the routing node converts the mobile-terminated IS-41 SMDPP Invoke message to a mobile-originated GSM Forward Short Message message. The routing node sends the GSM MO Forward Short Message message to a GSM SMSC, which is responsible for delivering the message to the intended recipient. Because the routing node converts the mobile-terminated IS-41 messages to a mobile-originated GSM message, the receiving GSM SMSC believes the message to have originated from a GSM MSC receiving a message from a mobile station. As a result, the GSM SMSC simply delivers the message to its intended recipient without further involvement from the routing node.

According to yet another aspect, a routing node according to an embodiment of the present invention is capable of handling call signaling between IS-41 and GSM subscribers to establish calls between the subscribers without translating every message from IS-41 to GSM and vice versa. This applies particularly in the case where the technology, i.e., IS-41 or GSM, of the subscriber being called is not known by the MSC handling the call. The functionality for setting up calls is similar to that described above for delivering short message service messages in that when the routing node receives a location request of and the receiver uses a different application-layer mobile communications protocol than the sender, the routing node responds to the location request with the GSM or IS-41 Routing Number (RN). The sending MSC receives the location request response and sends an IAM message to the MSC serving the intended recipient. Because the routing node functions as pseudo-HLR, rather than simply a protocol converter, the routing node has a lower processing load than that of a conventional message routing gateway and reduces network traffic.

DETAILED DESCRIPTION OF THE INVENTION

Figure 1:
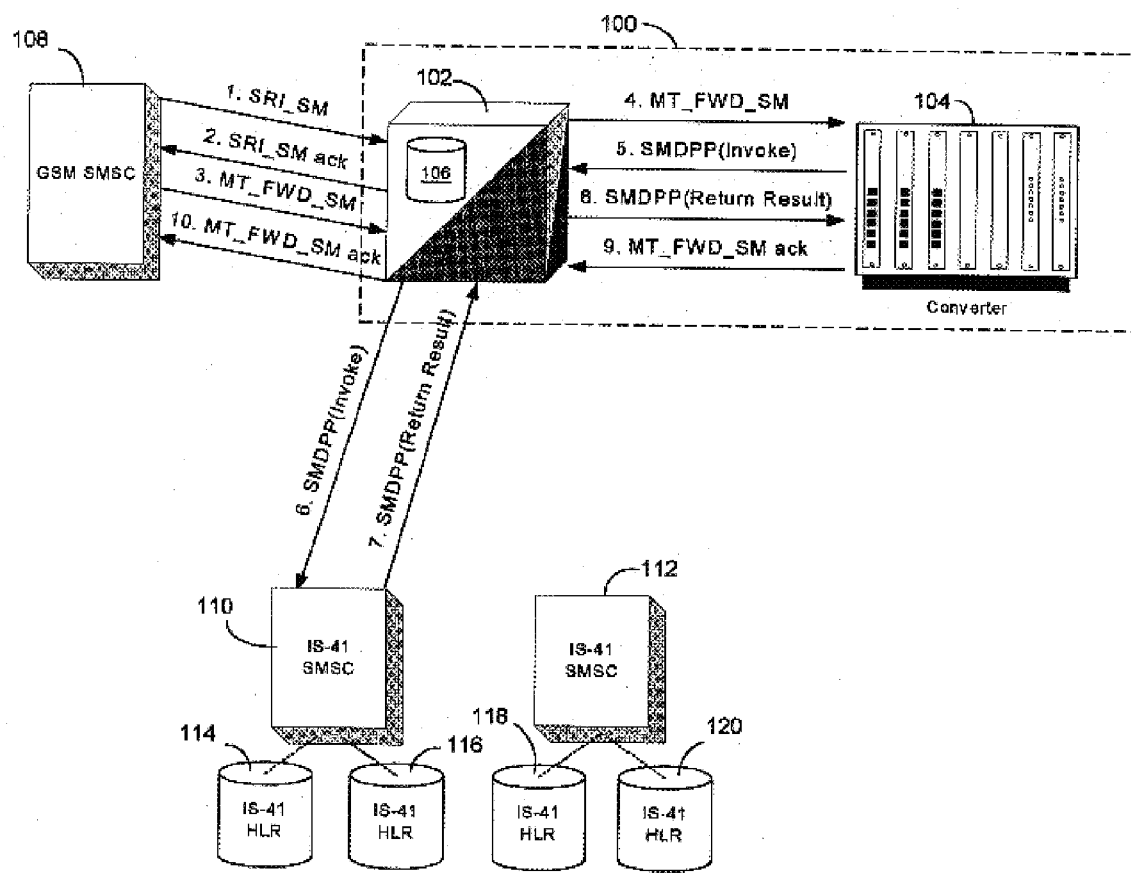
FIG. 1 is a network diagram illustrating an exemplary message flow for delivering a GSM-originated short message service message to an IS-41 subscriber according to an embodiment of the present invention.

Preferred embodiments of the invention will now be explained with reference to the accompanying drawings. In the drawings, unless otherwise indicated, like reference numerals refer to like elements.

Short Message Originated from GSM Subscriber Destined for IS-41 Subscriber

FIG. 1 is a network diagram illustrating a routing node according to an embodiment of the present invention. In FIG. 1, routing node 100 includes a routing element 102 and a converter 104. Routing element 102 may be any type of node capable of routing messages in a mobile communications network. For example, routing element 102 may be a signal transfer point capable of routing application-layer mobile communications messages over an SS7 network using SS7 MTP routing and global title translation. Alternatively, routing element 102 may be an SS7/IP or an SS7/X.25 gateway capable of routing application-layer mobile communications messages over SS7 and IP networks or SS7 and X.25 networks. In yet another alternative embodiment, routing element 102 may be an IP router capable of routing application-layer mobile communications messages over an IP network. In a further alternative embodiment, routing element may be an ATM switch capable of routing application-layer mobile communications messages over an ATM network.

In a preferred embodiment of the invention, routing element 102 includes SS7 MTP routing and global title translation capabilities for routing application-layer mobile communications messages over an SS7 network. An exemplary commercially-available product capable of performing these SS7 functions is the Eagle® signal transfer point available from Tekelec of Calabasas, Calif. An exemplary commercially-available product for performing both SS7 and IP routing functions is the IP$^7$® Secure Gateway, also available from Tekelec.

According to an important aspect of the invention, routing element 102 includes an application-layer mobile communications protocol identification and translation database 106. Database 106 includes fields for identifying the protocol of an incoming application-layer mobile communications protocol message and for inserting parameters in the message that make routing node 100 appear as an HLR or an MSC. The operation and contents of database 106 will be discussed in more detail below.

Converter 104 converts messages from one application-layer mobile communications protocol to another application-layer mobile communications protocol. For example, converter 104 may convert messages from IS-41 to GSM and vice versa. Converter 104 may include any suitable hardware platform on which conversion software may execute. For example, converter 104 may be a personal computer, a server, or a workstation. An exemplary commercially-available hardware platform suitable for use as converter 104 may be a Netra® available from SUN Microsystems.

Converter 104 may be connected to routing element 102 via any suitable high-speed connection, such as an Ethernet connection or an ATM connection. In addition, although the example illustrated in FIG. 1 depicts converter 104 and routing element 102 as separate elements, the present invention is not limited to such an embodiment. For example, in an alternative embodiment, converter 104 may be included within routing element 102 as hardware and/or software executing on one or more processors of routing element 102.

The network illustrated in FIG. 1 includes a variety of standard mobile network elements used to establish calls and deliver short message service messages between mobile subscribers. In the illustrated example, the network includes a GSM short message service center 108 for delivering short message service messages to and from GSM subscribers, IS-41 short message service centers 110 and 112 for delivering short message service messages to and from IS-41 subscribers, and IS-41 HLRs 114, 116, 118, and 120 for storing location information regarding IS-41 subscribers. The operation of the network illustrated in FIG. 1 in delivering a short message service message originating from a GSM mobile subscriber to an IS-41 mobile subscriber will now be explained in detail.

When a GSM mobile subscriber sends a short message service message to a IS-41 mobile subscriber, the message originates at the GSM mobile subscriber's handset, travels over the air interface to a base station, and travels from the base station to a GSM mobile switching center. Because the operation of these elements is not essential to explaining the invention, these elements are omitted from FIG. 1. The GSM mobile switching center delivers the short message service message to a GSM short message service center, such as SMSC 108 illustrated in FIG. 1.

Referring to the call flow diagram illustrated in FIG. 1, in step 1, in response to receiving the short message from the GSM MSC, SMSC 108 formulates a Send-Routing-Info-for-SM (SRI_SM) message including the MSISDN of the destination mobile subscriber's handset in order to obtain the temporary routing address of the destination mobile subscriber. According to ETS 300 974: Digital Cellular Telecommunications System (Phase 2+) Mobile Application Part (MAP) Specification, GSM 09.02 version 5.15.1, Release 1996, (hereinafter, "the MAP Specification") the proper destination for an SRI_SM message is an HLR. In the illustrated embodiment, SMSC 108 sends the message to the HLR via routing node 100, which functions as an STP. Based on a configured set of triggers in the message (e.g. GTI, TT, NP and NAI), routing node 100 sends the message to database 106, which functions as a multi-protocol HLR.

In step 2, routing node 100 performs a lookup in database 106 using the MSISDN number extracted from the MAP portion of the SRI_SM message. In this example, it is assumed that the lookup in database 106 results in a match for the MSISDN, which specifies the address of an IS-41 SMSC, indicating that the message is addressed to an IS-41 subscriber. For purposes of this example, the SMSC ID returned by database 106 is assumed to the ID of IS-41 SMSC 110. The dialed number (MSISDN) contained in the MAP message may actually be an IS-41 mobile identification number (MIN) or Mobile Directory Number (MDN), since the dialed number is for an IS-41 subscriber.

According to an important aspect of the invention, rather than converting the SRI-SM message to an IS-41 location request message, routing node 100 formulates a GSM SRI_SM acknowledgement containing the SMSC ID of IS-41 SMSC 110. The SMSC ID of IS-41 SMSC 110 is preferably stored in the MSC Number field of the SRI_SM acknowledgement message. According to the MAP Specification, the MSC Number field is used to store the identifier of the MSC serving the destination mobile subscriber. However, according to the present invention, rather than storing the number of an MSC, this field carries the ID of an IS-41 SMSC. The sending GSM SMSC will believe that the ID is for a GSM MSC and will formulate a subsequent message that it believes to be directed to a GSM MSC. The IMSI parameter in the SRI_SM acknowledgement message is set to the MIN of the IS-41 subscriber. This is either received as the MSISDN or obtained from database 106.

In step 3 GSM SMSC 108 formulates and sends a Mobile Terminal Forward Short Message (MT_FWD_SM) message using the ID of IS-41 SMSC 110 as the SCCP CdPA. The MT_FWD_SM message indicates route-on-GT. The MAP portion of the message contains Dest Addr=MIN (this may be equivalent to the IMSI for a GSM subscriber). The MAP Originating Address parameter specifies the address of GSM SMSC 108.

In response to receiving the MT_FWD_SM message, routing element 102 performs GTT using the SMSC ID of IS-41 SMSC 110 stored in the SCCP CdPA field. The GTT tables, which may be included in database 106 or in a GTT database separate from database 106, contain default translation for the ID of SMSC 110 to the address of converter 104.

In step 4, once the GTT has been performed, routing element 102 forwards, i.e., MTP routes, the MT_FWD_SM message to converter 104. In response to receiving the MT_FWD_SM message, converter 104 creates a call record. The call record preferably includes the Invoke ID parameter, the originating GSM SMSC ID parameter, and the CdPA parameter, which is the IS-41 SMSC ID, extracted from GSM MT_FWD_SM message.

Converter 104 includes a table for mapping the IS-41 SMSC ID in the SCCP CdPA of a received GSM message to an IS-41 SMSC point code/subsystem number (PC/SSN). In this example, it is assumed that the SMSC ID of IS-41 SMSC 110 maps to the point code/subsystem number of IS-41 SMSC 110. According to an important aspect of the invention, converter 104 maps the mobile-terminated GSM MT_FWD_SM message into a mobile-originated IS-41 SMDPP message with a TCAP Invoke component. The mapping may be performed as follows:

MAP Portion of SMDPP Message:
        Invoke ID=Invoke ID from GSM MT_FWD_SM
        MIN parameter=IMSI (destination address parameter from MT_FWD_SM)
        SMS Bearer Data=SM data (UI parameter from MT_FWD_SM)
        SMS Destination Addr=IMSI (destination address parameter from MT_FWD_SM), if needed
        SMS Originating Addr=GSM SMSC ID (originating address parameter from MT_FWD_SM)
    SCCP Portion of SMDPP Message:
        SCCP CdPA=PC/SSN of IS-41 SMSC associated with the SMSC ID of IS-41 SMSC 110
        SCCP CgPA=PC/SSN of converter 104.

Mapping the mobile-terminated GSM message to a mobile-originated IS-41 message makes routing node/converter 100 appear as an MSC to downstream nodes because in GSM and IS-41 networks, MSCs originate messages containing the short message from the mobile station and forward these messages to SMSCs for delivery. Appearing as or simulating an MSC removes routing node 100 from participation in MAP error control scenarios that could occur downstream from the SMSC. As a result, routing node 100 has a lower processing load than a conventional roaming gateway that translates every message and must therefore translate between the error control messages of the protocols After formulating the SMDPP message, in step 5, converter 104 sends the message route-on-SSN to routing element 102. In step 6, routing element 102 MTP routes message to IS-41 SMSC 110. In step 7, IS-41 SMSC 110 sends an SMDPP message including a TCAP Return Result component back to converter 104 PC/SSN via routing element 102 route-on-SSN. In step 8, routing element 102 MTP routes the SMDPP message to converter 104. Meanwhile, IS-41 SMSC 110 processes the short message as it would any other mobile-originated short message service message that it receives, i.e., SMSC 110 attempts to deliver the message to its intended recipient.

In response to receiving the SMDPP message, converter 104 retrieves Invoke ID from the SMDPP message and locates the associated call record. Converter 104 maps the IS-41 SMDPP Return Result message to a GSM MT_FWD_SM_ACK message as follows:

MAP PORTION:
  Invoke ID=Invoke ID from the SMDPP Return Result message—This is the original Invoke ID from the MT_FWD_SM message.
  SM Data=SMS Bearer Data (if returned from IS-41 SMSC 110)
  User Error=Mapping of SMS_CauseCode from the SMDPP Return Result message if the SMDPP Return Result indicates a NACK, blank if ACK
SCCP PORTION:
  CdPA=GSM SMSC 108, route-on-GT (retrieved from converter's call record)
  CgPA=IS-41 SMSC ID for SMSC 110, route-on-GT (retrieved from converter's call record)

Once converter 104 builds the GSM MT_FWD_SM acknowledge message, in step 9, converter 104 forwards the message to routing element 102. Routing element 102 performs GTT on message, and, in step 10, routes the message to GSM SMSC 108.

Short Message Originated from IS-41 Subscriber Destined for GSM Subscriber

Figure 2:
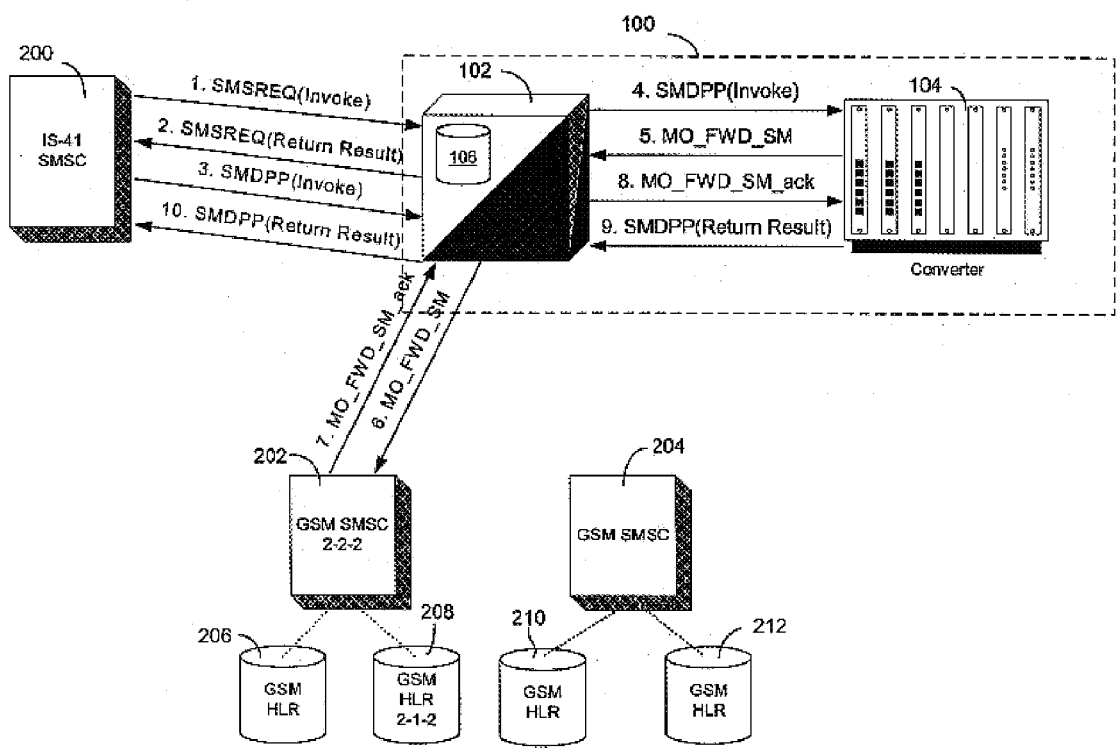
FIG. 2 is a network diagram illustrating an exemplary message flow for delivering an IS-41-originated short message service message to a GSM subscriber according to an embodiment of the present invention.

As stated above, in addition to the capability of routing GSM-originated short message service messages to IS-41 subscribers, a routing node according to embodiments of the present invention is preferably also capable of routing IS-41-originated short message service messages to GSM subscribers. FIG. 2 is a network diagram illustrating the nodes involved in delivering an IS-41-originated short message service message to a GSM subscriber. In addition to routing node 100, the illustrated network includes various network elements used to establish calls and deliver short message service messages between mobile subscribers. For example, the network includes an IS-41 short message service center 200 for delivering short message service messages to and from IS-41 subscribers, GSM short message service centers 202 and 204 for delivering short message service messages to and from GSM subscribers, and GSM HLRs 206, 208, 210, and 212 for storing location information regarding GSM subscribers. The operation of the network illustrated in FIG. 2 in delivering a short message service message originating from an IS-41 mobile subscriber to a GSM mobile subscriber will now be explained in detail.

When an IS-41 mobile subscriber sends a short message service message to a GSM mobile subscriber, the message originates at the IS-41 mobile subscriber's handset, travels over the air interface to a base station, and travels from the base station to an IS-41 mobile switching center. Because the operation of these elements is not essential to explaining the invention, these elements are omitted from FIG. 2. The IS-41 mobile switching center delivers the short message service message to an IS-41 short message service center, such as SMSC 200 illustrated in FIG. 2.

Referring to the call flow diagram illustrated in FIG. 2, in step 1, in response to receiving the short message from the IS-41 MSC, SMSC 200 formulates an SMS request (SMSREQ) message including a TCAP Invoke component to obtain the temporary routing address of the intended recipient. According to TIA/EIA IS-41.3-C, Feb. 1996, (hereinafter, "the IS-41 Specification") the proper responding functional entity for an SMSREQ message originating from an SMSC is an HLR that holds the subscribers information. However, in the illustrated embodiment, SMSC 200 sends the message to the point code and subsystem number of database 106 in routing node 100, which functions as an HLR in this instance.

In response to receiving the SMSREQ message, routing node 100 performs a lookup in database 106 using the mobile identification number (MIN) extracted from the MAP portion of the SMSREQ message. In this example, it is assumed that the lookup in database 106 results in a match for the MIN, which specifies the address of a GSM SMSC, indicating that the message is addressed to a GSM subscriber. For purposes of this example, the SMSC ID returned by database 106 is assumed to be the ID of GSM SMSC 202.

According to an important aspect of the invention, rather than converting the SMSREQ message to a GSM Send Routing Information for Short Message message, routing element 102 formulates an SMSREQ message containing a TCAP Return Result component containing the address of routing element 102 stored in the SMS_Address field. According to the IS-41 Specification, the SMS_Address field is used to store the temporary routing address, which can be used to deliver a short message to a mobile station. This field has conventionally been populated with the address of the MSC serving the mobile subscriber. By storing the address of routing element 102 in the SMS_Address field, routing element 102 "tricks" IS-41 SMSC 200 into believing that routing element 102 is the destination MSC for the short message. This step, along with subsequent steps described below, reduces the processing performed by routing element 102 over conventional roaming gateways that simply converted all of the messages.

In step 2, routing element 102 sends the SMSREQ Return Result message to IS-41 SMSC 200. Because IS-41 SMSC 200 believes routing element 102 to be the destination MSC, in step 3, IS-41 SMSC 200 formulates and sends a mobile-terminated SMDPP invoke message using the DPC of routing element 102 and specifies "route-on-SSN" in the SCCP portion of the message. The MAP portion of the SMDPP message contains the SMS_BearerData (stores the actual short message), SMS_TeleserviceIdentifier (stores identification of the teleservice; used for interpreting the bearer data), MIN of recipient, SMS_OriginatingAddress (stores IS-41 SMSC ID), and SMS_OriginalOriginatingAddress (stores MIN of sender) parameters.

In response to the SMDPP message, routing element 102 passes it to the local subsystem indicated in the SSN parameter. The logic elements in routing element 102 indicate that since the SMDPP is routed to its PC/SSN, and it is an IS-41 message destined for a GSM subscriber, it needs to be forwarded to converter 104. Routing element 102 leaves the PC/SSN of IS-41 SMSC 200 in the SCCP CgPA portion of the message. Before forwarding the SMDPP message to converter 104, routing element 102 performs a second lookup in database 106 on the MIN from the SMDPP message. Routing element 102 finds a match (as before) and obtains the SMSC ID of GSM SMSC 202. Routing element 102 inserts SMSC ID of GSM SMSC 202 into the SMS_DestinationAddress parameter of the SMDPP message and, in step 4, sends the SMDPP message to converter 104.

In response to receiving the SMDPP message, converter 104 creates a call record with the Invoke ID and PC/SSN of routing element 102 and PC/SSN of IS-41 SMSC 200 extracted from the SMDPP message. According to an important aspect of the invention, converter 104 maps the mobile-terminated SMDPP message into a GSM MO_FWD_SM (mobile-originated) as follows:

MAP PORTION:
  Invoke ID=Invoke ID from IS-41 SMDPP
  DestinationAddress (SM RP DA)=GSM SMSC from SMS_DestinationAddress parameter
  OriginationAddress (SM RP OA)=MIN of sender received in SMS_OriginalOriginatingAddress
  Short Message Data (SM RP UI) SMS_BearerData from SMDPP
SCCP PORTION:
  CdPA=GSM SMSC 202, route-on-GT
  CgPA=ID of converter 104, route-on-GT Converting the message from a mobile-terminated IS-41 message to a mobile-originated GSM message makes routing node 100 appear as a GSM MSC to GSM SMSC 202. As a result, routing element 102 can simply forward a short message to GSM SMSC 202 for delivery without implementing the error control mechanisms of two protocols, as required in conventional roaming gateways. Accordingly, in step 5, converter 104 sends the MO_FWD_SM message route-on-GT to GSM SMSC 202 via routing element 102. Routing element 102 performs GTT based on CdPA=SMSC 202 ID, and, in step 6, routes the MO_FWD_SM message to GSM SMSC 202. GSM SMSC 202 handles the steps required to deliver the short message to the GSM subscriber. In step 7, GSM SMSC 202 sends a MO_FWD_SM_ACK message to routing element 102 with the CdPA field set to the global title address of converter 104. Routing element 102 performs GTT, and, in step 8, routes the MO_FWD_SM_ACK message to converter 104.

In response to receiving the MO_FWD_SM_ACK, converter 104 retrieves the Invoke ID parameter from the message and locates associated call record. Converter 104 maps the GSM MO_FWD_SM_ACK message to an IS-41 SMDPP Return Result message as follows:

MAP PORTION:
  Invoke ID=Invoke ID from GSM MO_FWD_SM_Ack-this is original Invoke ID from IS-41 SMDPP
  SMS BearerData=SM Data (if returned from GSM SMSC 202)
  SMS_CauseCode=Mapping of User Error from MO_FWD_SM_ACK if present, blank if not
SCCP PORTION:
  CdPA=IS-41 SMSC 200 PC/SSN, route-on-SSN (stored in converter's call record)
  CgPA=routing element 102 PC/SSN, route-on-SSN (stored in converter's call record)

In step 9, converter 104 sends the SMDPP Return Result message to routing element 102. In step 10, routing element 102 MTP-routes the SMDPP Return Result message to IS-41 SMSC 200.

Call-Related Message Processing

Figure 3:
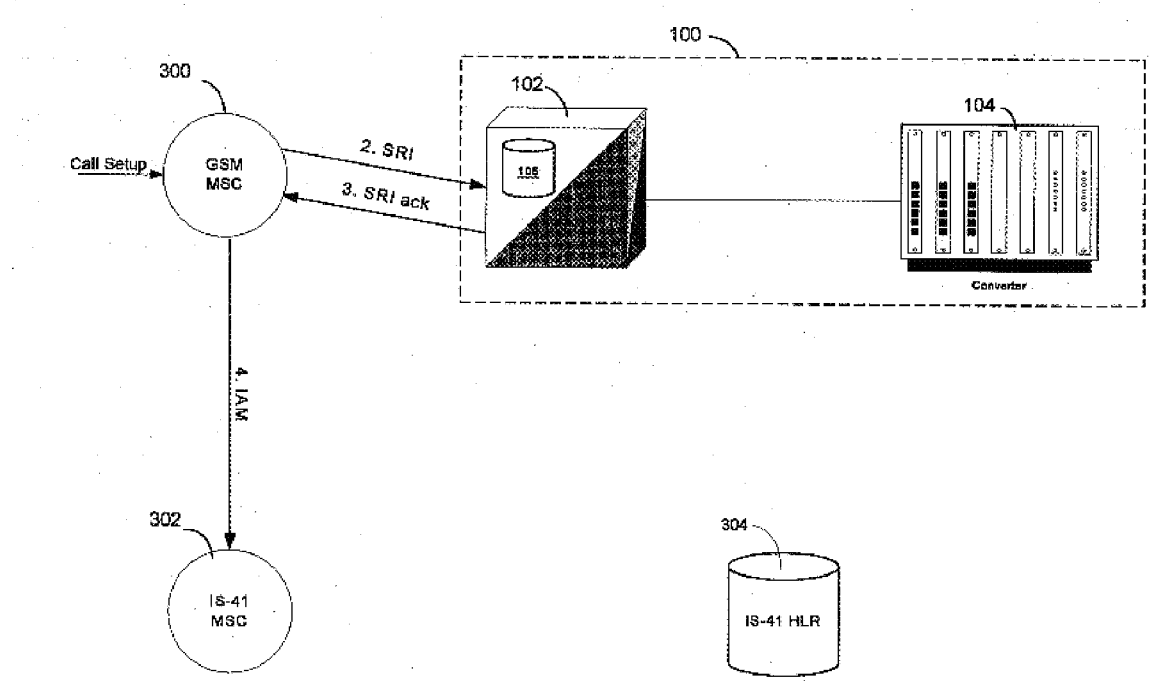
FIG. 3 is a network diagram illustrating an exemplary message flow for setting up a call from a GSM subscriber to an IS-41 subscriber according to an embodiment of the present invention.

The present invention is not limited to routing only short message service messages between mobile subscribers of different application-layer mobile communications protocols. For example, routing node 100 may also be used to route messages for establishing calls, such as voice calls, between mobile subscribers of different application-layer mobile communications protocols. This applies particularly in the case where the technology, i.e., GSM or IS-41, of the subscriber being called is not known by the MSC handling the call. FIG. 3 is a network diagram illustrating exemplary signaling between routing node 100 and other network elements for establishing a call originating from a GSM subscriber to an IS-41 subscriber. In step 1, a GSM MSC 300 receives a call setup message for establishing a call from a GSM subscriber to an IS-41 subscriber. By default, in step 2, GSM MSC 300 sends an SRI message to routing node 100 to obtain the location of the called party. Rather than converting the SRI message into an IS-41 Location Request message, routing element 102 performs a lookup in database 106. Database 106 matches the MSISDN number in the SRI message with a routing number (RN), which corresponds to an IS-41 HLR, such as IS-41 HLR 304. In step 3, routing element 102 returns the HLR ID as an RN to GSM MSC 300 in an SRI ACK message.

In response to receiving the SRI ACK message, GSM MSC 300 recognizes that the call is destined for an IS-41 subscriber and, in step 4, sends an IAM message to IS-41 MSC 302. The IAM message is routed based on the RN received from the database. From this point, the two MSCs rely on normal IS-41 ⇆ GSM call setup procedures to complete the call. Because routing node 100 returns the RN for the IS-41 network, rather than translating the message to an IS-41 Location Request message, the processing load on routing node 100 is reduced over that of conventional roaming gateways. Call setup time may also be reduced.

Figure 4:
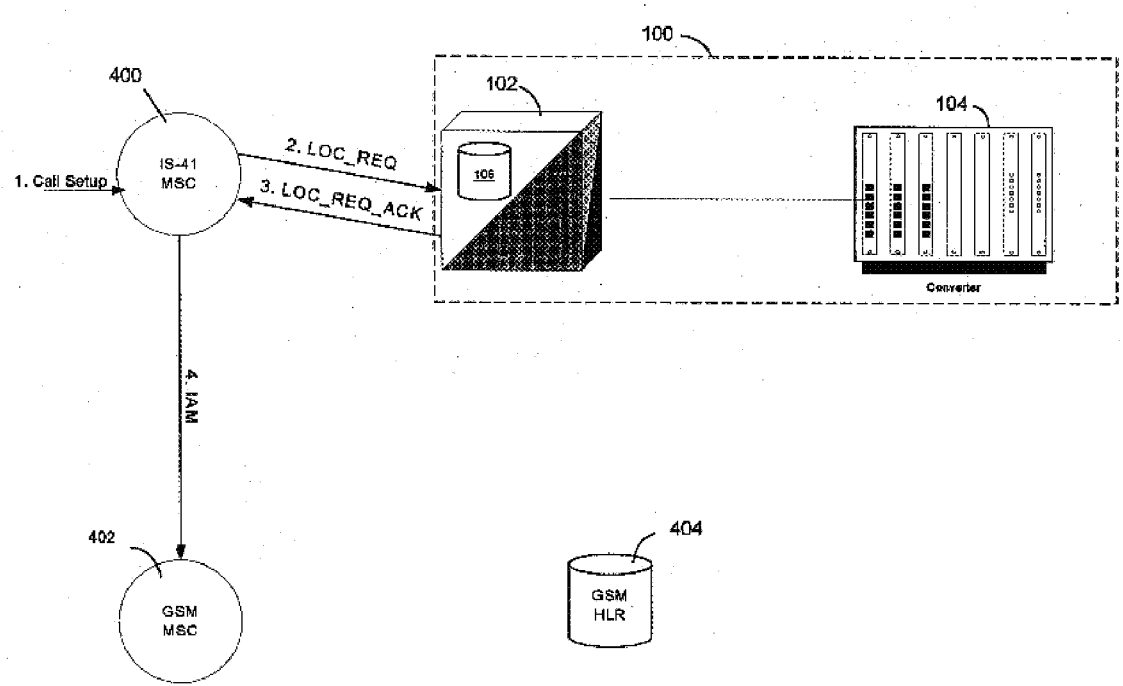
FIG. 4 is a network diagram illustrating an exemplary message flow for setting up a call from an IS-41 subscriber to a GSM subscriber according to an embodiment of the present invention.

FIG. 4 is a network diagram illustrating an exemplary call flow for routing an IS-41 initiated call to a GSM subscriber according to an embodiment of the present invention. Referring to FIG. 4, the network includes an IS-41 MSC 400, a GSM MSC 402, and a GSM HLR 404. In step 1, IS-41 MSC 400 receives a call setup message for establishing a call from a GSM subscriber to an IS-41 subscriber. In step 2, IS-41 MSC 400 formulates and sends an IS-41 Location Request message to routing node 100. Routing node 100 performs a lookup in database 106 using the mobile identification number in the received Location Request message. Since the called party is a GSM subscriber, in step 3, routing node 100 sends a Location Request Acknowledge message to IS-41 MSC 400 containing the HLR ID of GSM HLR 404 as a RN. In step 4, IS-41 MSC 400 sends an IAM message to GSM MSC 402. From this point, the two MSCs rely on normal IS-41 ⇆ GSM call setup procedures to complete the call. Because routing node 100 returns location information of the RN of the network serving the called party, rather than translating the IS-41 message, the processing load on routing node 100 is decreased over that of a conventional roaming gateway. Call setup time may also be reduced.

It will be understood that various details of the invention may be changed without departing from the scope of the invention. Furthermore, the foregoing description is for the purpose of illustration only, and not for the purpose of limitation-the invention being defined by the claims.

What is claimed is:

1. A routing node for delivering short message service (SMS) messages between subscribers of different application-layer mobile communications protocols, the routing node comprising:
   (a) a routing element for receiving, from a short message service center (SMSC) of a first application-layer mobile communications protocol, a message requesting location information of a mobile subscriber of a second application-layer mobile communications protocol and for formulating a response to the message including an address of a node other than a mobile switching center, the address being stored in a destination ID field of the response message, the destination ID field being adapted to store an address of a destination MSC for reaching the mobile subscriber; and
   (b) a converter operatively associated with the routing element for receiving, from the SMSC of the first application-layer mobile communications protocol, a mobile-terminated SMS delivery message of the first application-layer communications protocol and being addressed to the address in the destination ID field of the response message, the converter being adapted to formulate a mobile-originated SMS delivery message of the second application-layer mobile communications protocol based on the mobile-terminated SMS delivery message of the first application-layer mobile communications protocol.

2. The routing node of claim 1 wherein the routing element comprises an SS7 signal transfer point.

3. The routing node of claim 1 wherein the routing element comprises an SS7/IP gateway.

4. The routing node of claim 1 wherein the converter comprises a processing platform separate from the routing element.

5. The routing node of claim 1 wherein the converter comprises a processor internal to the routing element.

6. The routing node of claim 1 wherein the first application-layer mobile communications protocol is the American National Standards Institute (ANSI) Interim Standard 41 (IS-41) protocol and the second application-layer mobile communications protocol is the Global System for Mobile Communications (GSM) protocol.

7. The routing node of claim 1 wherein the first application-layer mobile communications protocol is the Global System for Mobile Communications (GSM) protocol and the second application-layer mobile communications protocol is the American National Standards Institute (ANSI) Interim Standard 41(IS-41) protocol.

8. The routing node of claim 1 wherein the destination ID field comprises the GSM MSC_ID field and the address stored in the GSM MSC_ID field comprises an address of a GSM SMSC.

9. The method routing node of claim 1 wherein the destination ID field comprises the IS-41 SMS_Address field and address stored in the SMS_Address field comprises an address of a routing element.

10. The routing node of claim 1 wherein the message is of the first application-layer mobile communications protocol and wherein the routing element is adapted to formulate the response without converting the message to the second application-layer mobile communications protocol.

11. A method for communicating messages between subscribers of different application-layer mobile communications protocols, the method comprising:
   (a) receiving, from a network element of a first application-layer mobile communications protocol, a first message requesting the location of a subscriber of a second application-layer mobile communications protocol;
   (b) in response to receiving the first message, formulating a second message of the first application-layer mobile communications protocol;
   (c) including, in a destination ID field of the second message, an address of a node other than a mobile switching center, the destination ID field being adapted to store an address of a destination MSC for reaching the mobile subscriber;
   (d) forwarding the second message to the network element of the first application-layer mobile communications protocol;
   (e) receiving, from the first network element, a third message formulated according to the first application-layer mobile communications protocol and for delivering an SMS message to the subscriber, the third message being addressed to the address stored in the destination ID field of the first message; and
   (f) formulating, based on the third message, a fourth message formatted according to the second application layer mobile communications protocol for delivering the SMS message to the subscriber.

12. The method of claim 11 wherein receiving the first message includes receiving the first message from a short message service center of the first application-layer mobile communications protocol.

13. The method of claim 11 wherein including an address in a destination ID field of the second message comprises including a GSM SMSC ID in a GSM MSC_ID field of the second message.

14. The method of claim 11 wherein including an address in a destination ID field of the second message comprises including a routing node address in an IS-41 SMS_ADDR field of the second message.

15. The method of claim 11 wherein the first application-layer mobile communications protocol comprises the American National Standards Institute (ANSI) Interim Standard 41 (IS-41) protocol and the second application-layer mobile communications protocol comprises the Global System for Mobile Communications (GSM) protocol.

16. The method of claim 11 wherein the first application-layer mobile communications protocol comprises the Global System for Mobile Communications (GSM) protocol and the second application-layer mobile communications protocol comprises the American National Standards Institute (ANSI) Interim Standard 41 (IS-41) protocol.

17. The method of claim 11 wherein steps (a)–(f) are performed at a signal transfer point.

18. The method of claim 11 wherein steps (a)–(f) are performed at an SS7/IP signaling gateway.

19. The method of claim 11 wherein the third message comprises a mobile-terminated SMS delivery message of the first application layer mobile communications protocol and the fourth message comprises a mobile originated SMS delivery message of the second application layer mobile communications protocol.

20. A method for establishing a call between subscribers of different application-layer communications protocols, the method comprising:
   (a) receiving, from a mobile switching center (MSC) of a first application-layer mobile communications protocol, a first message requesting the location of a subscriber of a second application-layer mobile communications protocol;

(b) performing a lookup in a database based on a called party identifier in the first message and obtaining a routing number for a network serving the mobile subscriber of the second application-level mobile communications protocol;

(c) formulating a second message of the first application-layer mobile communications protocol;

(d) including the routing number in the second message; and (e) forwarding the second message to the MSC of the first application-layer mobile communications protocol, wherein performing steps (a)–(e) includes performing steps (a)–(e) without converting the first message to the second application-layer mobile communications protocol.

21. The method of claim 20 wherein the first application-layer mobile communications protocol comprises IS-41 and the second application-layer mobile communications protocol comprises GSM.

22. The method of claim 20 wherein the first application-layer mobile communications protocol comprises GSM and the second application-layer mobile communications protocol comprises IS-41.

23. The method of claim 20 wherein steps (a)–(e) are performed at a signaling message routing node.

24. The method of claim 23 wherein the signaling message routing node includes a signal transfer point.

25. The method of claim 23 wherein the signaling message routing node includes an SS7/IP gateway.

* * * * *